A United States Patent Office 3,459,739
Patented Aug. 5, 1969

3,459,739
3 - SPIRO - 3' - DIAZIRIDINE- AND -3'-DIAZIRINE-
DERIVATIVES OF THE ANDROSTANE AND
ESTRANE SERIES
Poul Borrevang, Vanlose, Denmark, assignor to Novo
Terapeutisk Laboratorium A/S., Copenhagen, Denmark, a Danish company
No Drawing. Filed Nov. 27, 1964, Ser. No. 414,445
Claims priority, application Great Britain, Nov. 28, 1963, 47,061/63; Aug. 12, 1964, 32,814/64
Int. Cl. C07c 173/10, 169/20; A61k 27/00
U.S. Cl. 260—239.5                                      25 Claims The present invention relates to new and useful steroid compounds.

The new steroid compounds are characterized by having in 3-position in the steroid molecule a 3-membered ring system containing two nitrogen atoms and one carbon atom, the latter being carbon atom number 3 in the A-ring of the steroid molecule. Thus, the new compounds may be defined as steroids carrying in 3-position a spiro-diaziridine or a spiro-diaziridine ring, which latter may carry substituents.

It has been found that the introduction of the ring system referred to above into 3-position of steroids in a great number of cases results in interesting and valuable modifications of the pharmacological properties of the steroids and sometimes even results in new and unexpected pharmacological properties.

It has also been found that the new steroid compounds are useful as intermediates for the production of other steroid compounds.

Illustrative of the modifications of the pharmacological properties of the steroids that may result from the introduction of the new ring system are enhancement of peroral manifestations of some of the biological effects of the steroids and modifications of the mutual ratio of the various physiological properties of the steroids. A prominent example hereof is the modification of the peroral ratio of the anabolic effect to the androgenic effect.

It is a well known fact that in the treatment of various diseases it is often desirable or necessary to use drugs which have an anabolic effect. One of the compunds which was first demonstrated to have an anabolic effect by peroral administration is the now well known 17α-methyl testosterone. However, 17α-methyl testosterone also shows a pronounced androgenic effect, which is undesirable from a medical point of view. A very intensive research has been carried on with the purpose of obtaining compounds in which the ratio of anabolic to androgenic effect is so high that the androgenic effect will not or only to a harmless extent manifest itself in the doses used.

It has been found that the introduction of the above mentioned spiro-diaziridine or -diaziridine ring into steroids of e.g. the 17α-alkyl androstane series in many cases leads to the result that the peroral anabolic effect is so considerably increased in comparison with the peroral androgenic effect that a very favorable ratio is obtained.

Thus, for instance, in biological tests which were conducted using 17α-methyl testosterone as reference substance it has been found that by the introduction of the above mentioned ring system it is possible to obtain no increase or only a moderate increase of the peroral androgenic effect simultaneously with a considerable increase of the peroral anabolic effect, so that a good ratio is obtained. It has even proved possible to obtain a decrease of the androgenic effect simultaneously with an increase of the anabolic effect. In both cases, substances with valuable pharmacological properties are obtained.

It has further been found that when using as starting material derivatives of the androstane series having androgenic and anabolic effects which are considerably greater than those of 17α-methyl testosterone, it is possible to decrease the androgenic properties very considerably and at the same time to increase the anabolic properties, so that a very high ratio is obtained. This effect is particularly pronounced when a fluorine atom is present in 9-position and a hydroxy group is present in 11-position.

In order to obtain the above mentioned peroral effects it has hitherto been considered necessary that a 17α-alkyl group is present in the steroid molecule. From other medical considerations, however, the presence of a 17α-alkyl group may be undesirable, and much research activity has concentrated on finding possibilities of eliminating this 17α-alkyl group while still obtaining a peroral androgenic and/or anabolic effect. It has now been found that by introducing into steroids without a 17α-alkyl group the described diazirine or diaziridine ring it is in many cases possible to obtain substances having a good peroral androgenic effect or substances having pronounced peroral anabolic effect and low peroral androgenic effect. Particularly with various 17β-esters it has proved possible to obtain the last mentioned combination of effects. However, even 17β-keto steroids containing the said ring system may possess a good peroral anabolic (myotrophic)/androgenic ratio, their peroral anabolic effect being in some cases of the same order as that of 17α-methyl testosterone.

As will be understood from the foregoing the introduction of the spiro-diazirine or -diaziridine ring may favor the peroral manifestations of the androgenic effect. Some of the compounds prepared by the process of the invention and showing a pronounced androgenic effect by peroral administration have surprisingly been found to show no androgenic effect by subcutaneous administration. Some of these new compounds showing negligible androgenic effect by subcutaneous administration have subcutaneously shown an anti-estrogenic effect of the same order as that of testosterone propionate.

Finally, it has been found that by the introduction of the spiro-diazirine or -diaziridine system into some steroids of the estrane series it is possible to obtain compounds having a peroral androgenic effect of the same order as that of 17α-methyl testosterone and simultaneously showing an extremely high peroral anti-estrogenic effect. One of the new compounds showing these properties has in comparative tests using a very strong androgenic agent as reference substance shown an even more pronounced anti-estrogenic effect than this agent.

Thus, it will be seen that the introduction of a spiro-diazirine or spiro-diaziridine ring in 3-position in quite a number of steroids opens a new and surprising path in steroid research and makes it possible to obtain new modified and interesting therapeutic properties.

More specifically, the process of the invention is for the preparation of steroid compounds of the general formula

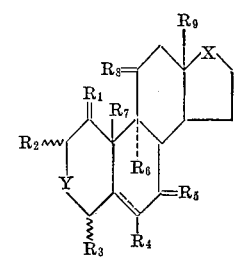

in which Y means one of the groups

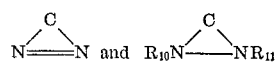

wherein $R_{10}$ and $R_{11}$ are hydrogen, alkyl, hydroxyalkyl, aralkyl, aryl or halogenaryl, X means

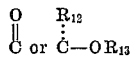

wherein $R_{12}$ is hydrogen or lower alkyl, and $R_{13}$ is hydrogen, cyclopent-1'-enyl, 1-lower-alkoxy-cycloalkyl, 1-hydroxy-halogen-lower-alkyl, or $R_{13}$ is $OCR_{14}$, wherein $R_{14}$ is hydrogen, alkyl, aralkyl, aryl, alkoxy-, alkoxy-phenoxy- or phenoxy-alkoxy-sulfonyl-alkyl, alkoxy-aralkyl or cycloalkyl-alkyl, $R_1$ means methylene, two hydrogen atoms or hydrogen and methyl, $R_2$ means hydrogen or methyl, $R_3$ means hydrogen or methyl, $R_4$ means hydrogen, methyl, chlorine, fluorine or two hydrogen atoms, $R_5$ means oxygen, two hydrogen atoms or hydrogen and methyl, $R_6$ means hydrogen, chlorine or fluorine, $R_7$ means hydrogen or methyl, $R_8$ means oxygen, two hydrogen atoms, or hydrogen and hydroxy, and $R_9$ means lower alkyl.

As it will be seen these steroids belong to the androstane, gonane and estrane series and may carry various substituents in 17-position. Regarding the meaning of the symbol $R_{13}$, 17β-(1'-ethoxy)-cyclopentyl and -cyclohexyl ethers are illustrating examples of steroids in which $R_{13}$ is 1 - alkoxy - cycloalkyl, 17β-(1-hydroxy-2,2,2-trichloroethyl), -(1 - hydroxy - 2-chloro-2'-chloroisopropyl) and -(1-hydroxy-2',2',2'-trifluoroisopropyl) ethers are illustrating examples of steroids in which $R_{13}$ is 1-hydroxy-halogen-lower-alkyl, 17β-esters of benzoic acid, p-chlorobenzoic acid and toluic acid are illustrating examples of steroids in which $R_{13}$ is $OCR_{14}$, wherein $R_{14}$ is aryl, ethyl, p-methoxyphenyl and phenoxyethyl esters of 17β-sulfoacetates are illustrating examples of steroids in which $R_{13}$ is $OCR_{14}$ wherein $R_{14}$ is alkoxy-, alkoxy-phenoxy- or phenoxy - alkoxy-sulfonylalkyl, 17β-p-hexoxy-phenylpropionates are illustrating examples of steroids in which $R_{13}$ is $OCR_{14}$ wherein $R_{14}$ is alkoxy-aralkyl, and 17β-cyclopentyl- and -cyclohexylpropionates are illustrating examples of steroids in which $R_{13}$ is $OCR_{14}$ wherein $R_{14}$ is cycloalkyl-alkyl.

Steroid compounds of the general formula referred to above in which $R_{12}$ is hydrogen are of particular importance because, as mentioned above, in spite of the fact that they carry no 17α-alkyl group, many of these steroids show a good peroral androgenic effect or a valuable ratio of anabolic-androgenic effect by oral administration.

Also steroid compounds of the general formula referred to above in which $R_{12}$ means methyl or ethyl and $R_{13}$ means hydrogen, while the diaziridine ring carries no substituents are of particular importance since with steroids of this type it is possible to obtain an increased peroral anabolic and/or androgenic effect as compared with 17α-methyl testosterone and/or an increased peroral ratio of myotrophic (anabolic) effect to androgenic effect.

More specifically my invention relates to steroid spirodiazirine or spiro-diaziridine derivatives within the 5α-androstane series and having the general formula

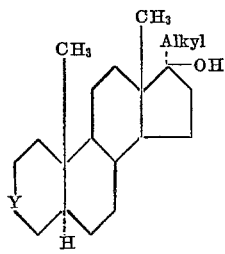

in which alkyl preferably means methyl or ethyl and Y means the spiro-diazirine ring or the preferably unsubstituted spiro-diaziridine ring, and having, if desired, an α-methyl group in 2-position.

Still more specified my invention relates to steroid spiro-diazirine or spiro-diaziridine derivatives within the 5α-androstane series and having the general formula

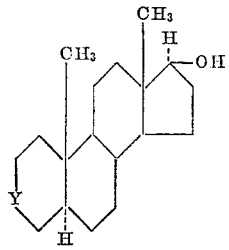

in which Y means the spiro-diazirine ring or the preferably unsubstituted spiro-diaziridine ring, and having, if desired, an α-methyl group in 2-position. In these compounds the hydroxy group in 17-position may be esterified or etherified to form either the group $OOCR_{14}$, wherein $R_{14}$ has the same meaning as in the general formula first referred to in my specification, or the group $OR_{13}$, wherein $R_{13}$ has the same meaning as that defined in the general formula first referred to in my specification, except hydrogen and $OCR_{14}$.

Biological tests have shown that it is of particular interest to have a fluorine atom in 9α-position. Such compounds may have the following general formula

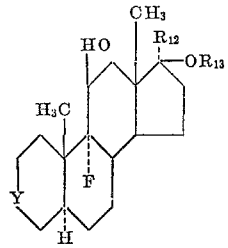

in which Y has the meaning referred to above and $R_{12}$ and $R_{13}$ have the meaning defined in the general formula first referred to in my specification. Also in these compounds there may be an α-methyl group in 2-position.

Another group of steroid compounds forming a part of my invention has the following general formula

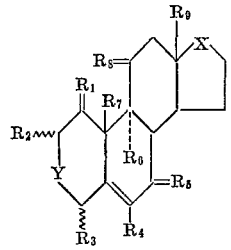

in which Y, X, $R_1$, $R_2$, $R_3$, $R_5$, $R_6$, $R_7$, $R_8$ and $R_9$ have the meaning defined in the general formula first referred to in my specification and $R_4$ means hydrogen, methyl, chlorine or fluorine.

Still another group of steroid compounds also forming a part of my invention has the following general formula

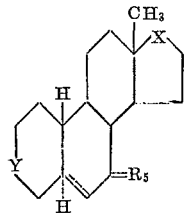

in which X and Y have the meaning defined in the general formula first referred to in my specification, and $R_5$ means oxygen, two hydrogen atoms or hydrogen and methyl.

Among the steroid spiro-diazirine and spiro-diaziridine are compounds having a strong anti-estrogenic effect by oral administration.

Among the steroid spiro-diazirine and spiro-diaziridine derivatives which can be produced are the following compounds which I consider a part of my invention:

17α-alkyl-11β,17β-dihydroxy-9α-fluoro-5α - androstane-3-spiro-3'-diazirine or -diaziridine, 17β-acyloxy-11β-hydroxy-9α-fluoro-5α-androstane-3-spiro-3'-diazirine or -diaziridine, 17α-methyl-11β,17β-dihydroxy-9α-fluoro-5α - androstane-3-spiro-3'-diazirine or -diaziridine, 2α-methyl-9α-fluoro-17α-alkyl-11β,17β - dihydroxy - 5α - androstane - 3-spiro-3'-diazirine or -diaziridine, 2α,17α-dimethyl-17β-hydroxy - 5α - androstane-3-spiro-3'-diazirine or -diaziridine, 17α-methyl-17β-hydroxy-5α-androstane - 3 - spiro - 3'- diazirine or -diaziridine, 17α-methyl-17β-hydroxy-Δ⁵-androsten-3-spiro-3'-diazirine or -diaziridine, 17β-acyloxy-5α-androstane-3-spiro-3'-diazirine or -diaziridine, 17β-formyloxy-5α-androstane-3-spiro-3'-diazirine or -diaziridine, 17β-propionyloxy-5α-androstane-3-spiro-3'-diazirine or -diaziridine, 5α-androstane-17-one-3-spiro-3'-diazirine or -diaziridine, 17β - acyloxy - Δ⁵ - androstene - 3-spiro-3'-diazirine or -diaziridine, 17β-acyloxy-11β-hydroxy-9α-fluoro-Δ⁵-androstene-3-spiro-3'-diazirine or -diaziridine and 17α-alkyl-17β-hydroxy-5α-estrane-3-spiro-3'-diazirine or -diaziridine.

My invention also comprises a process of making my novel and useful steroid compounds.

My process is in principle characterized by reacting a steroid compound having the partial configuration

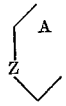

in which Z is a carbonyl or imino group or a derivative thereof which is convertible into an imino group, with a reactive amine derivative, such as NH₂R or R'NHR wherein R is an acid residue and R' has the same meaning as that defined above in connection with the symbols $R_{10}$ and $R_{11}$, respectively, in the presence of $NH_3$ or an amine, whereafter a resulting diaziridine group is oxidized to a diazirine group, if desired, and a resulting diazirine group is converted into a substituted diaziridine group, if desired.

By the term "imino group" is meant as well an unsubstituted as a substituted imino group.

It will be understood that the reactive group in the steroid used as starting material may not only be a carbonyl group or an imino group, but in addition a derivative thereof convertible into an imino group. It is believed that an imino group, if not present in the steroid used as starting material, is formed intermediately during the reaction.

As illustrating examples of suitable steroid starting materials may be mentioned 3-keto steroids, steroids carrying in 3-position an unsubstituted imino group, Schiff's bases and steroids carrying in 3-position a hydrazone group which may carry substituents.

Illustrating examples of reactive amine derivatives are hydroxylamine-O-sulfonic acid, chloramine, N-alkyl-hydroxyl-amine-O-sulfonic acid, and N-alkyl chloramine. It will be seen that these illustrating examples of reactive amine derivatives correspond to the general formulas NH₂R and R'NHR, the acid residue R being OSO₂OH or chlorine.

If the steroid used as starting material carries in 3-position an imino group, it is not mandatory to carry out the reaction in the presence of NH₃. Another basic-reacting agent may be used. As an illustrating example of such basic-reacting agent may be mentioned potassium hydroxide.

While for the preparation of most of the types of suitable steroid starting materials several well known methods are available, the preparation of the steroid starting materials containing in 3-position an unsubstituted imino group deserves particular mention, partly because many of these compounds are new and valuable intermediates as well for the process of the invention as for the preparation of other pharmacologically valuable compounds, and partly because their successful preparation is dependent on a number of factors. The starting steroids containing in 3-position an unsubstituted imino group are prepared by treating the corresponding 3-keto steroids with ammonia. By this treatment an equilibrium is apparently established. Accordingly, the formation of the imine must be promoted, for instance, by separation of the imine. As, however, these imino steroids are often rather soluble and thus difficult to precipitate, the specific useful combinations of starting steroid, solvent, and reaction conditions must be ascertained experimentally in each single case. In the examples is reported the preparation of a 3-imino steroid which as an exception precipitates well during the reaction.

The process may be carried out for instance from −30 to −40° C. up to room temperature or even higher. In many cases it is preferred to carry out main part of the reaction at about 0 to 5° C. and let the reaction complete at room temperature. As solvent medium may be used various commonly used solvents with the proviso that the solvent used must not be one which reacts with the reactants used. As illustrating examples of suitable solvents may be mentioned methanol and dioxane. Though the use of dry solvents is often preferred the process may also be carried out in the presence of water, especially when using an active amine derivative containing the group OSO₂OH.

When the desired reaction product is a 3-spiro-3'-diaziridine steroid in which the diaziridine group is unsubstituted, suitable embodiments of the process comprise treating a steroid used as starting material with hydroxylamine-O-sulfonic acid or chloramine in the presence of NH₃, chloramine being used in the proportion of one mole of chloramine to one mole of the steroid. Examples of suitable steroid starting materials are 3-keto-steroids, steroids carrying in 3-position an unsubstituted imino group, Schiff's bases, and steroids carrying in 3-position a hydrazone group. When using as starting compounds steroids carrying in 3-position an unsubstituted imino group, another basic-reacting agent, for instance potassium hydroxide, may be used instead of NH₃, though NH₃ is preferred.

When the desired reaction product is a 3-spiro-3'-diazirine steroid, suitable embodiments of the process comprise treating a steroid used as starting material with an excess of chloramine in the presence of NH₃. It is believed that in this process, which provides a most simple way of producing the diazirines, the chloramine itself acts as an oxidizing agent for the diaziridine group. Examples of suitable steroid starting materials are 3-keto steroids, steroids carrying in 3-position an unsubstituted imino group, Schiff's bases, and steroids carrying in 3-position a hydrazone group. When using as starting compounds steroids carrying in 3-position an unsubstituted imino group, another basic-reacting agent may be used instead of NH₃, though NH₃ is preferred.

A further suitable method of preparing 3-spiro-3'-diazirine steriods is by oxidizing a 3-spiro-3'-di-aziridine steroid in which the diaziridine group is unsubstituted, by means of an oxidizing agent, for example bromine, silver oxide, tertiary butyl hypochlorite or chromium trioxide.

When the desired reaction product is a 1'(2')-substituted 3-spiro-3'-diaziridine steroid, suitable embodiments of the process comprise treating the 3-keto steroid used as starting material with hydroxylamine-O-sulfonic acid or chloramine in the presence of R'NH₂ wherein R' is as defined above. Other suitable embodiments comprise treating steroids carrying a substituted imino group in 3-position with hydroxylamine-O-sulfonic acid or chloramine in the presence of a basic-reacting agent, preferably an amine. Further suitable embodiments comprise treating the 3-keto steroid used as starting material with R'NHOSO$_2$OH or R'NHCl in the presence of NH$_3$. Still further suitable embodiments comprise treating a steroid with an unsubstituted imino group in 3-position with R'NHOSO$_2$OH or R'NHCl in the presence of a basic-reacting agent, preferably NH$_3$.

A diazirine group may be converted into a monosubstituted diaziridine group for instance by Grignard synthesis.

When the desired reaction product is a 1',2'-disubstituted 3-spiro-3'-diaziridine steroid, suitable embodiments of the process comprise treating a 3-keto steroid with R'NHOSO$_2$OH or R'NHCl in the presence of R'NH$_2$ in which formulas each R' is one of the groups R$_{10}$ and R$_{11}$ as defined above. Other suitable embodiments comprise treating a steroid with an R'-substituted imino group in 3-position with R'NHOSO$_2$OH or R'NHCl, wherein each R' is one of the groups R$_{10}$ and R$_{11}$ as defined above, in the presence of a basic-reacting agent, preferably an amine.

While steroids of the general formula first referred to in the specification wherein OR$_{13}$ is an ester group can be prepared by the above methods using as active amine derivative—in the cases where such reactant is used—for instance NH$_2$Cl or R'NHCl, a further suitable method for the preparation of 17β-ester-3-spiro-3'-diazirine steroids is by treating a 17β-hydroxy-3-spiro-3'-diazirine steroid with a reactive acid derivative, e.g. an anhydride, a mixed anhydride or a halide, and specifically, a further suitable method for the preparation of esters of 17β-sulfoacyloxy-3-spiro-3'-diazirine steroids is by treating a 17β-hydroxy-3-spiro-3'-diazirine steroid with halogen-sulfonylacylhalide and reacting the resulting compound with the desired alcohol or phenol.

The following examples illustrate how representatives of the new steroids may be prepared.

EXAMPLE 1

3-imino-17α-methyl-17β-hydroxy-5α-androstane 16.0 g. of 17α-methyl-17β-hydroxy-5α-androstane-3-one were dissolved in 600 ml. of dry methanol at 40–50° C. The solution was cooled in a mixture of ice and water and dry ammonia was supplied at a relatively slow rate under continued ice cooling.

After 1 to 1½ hours a substance began to precipitate, the solution was now saturated with NH$_3$, the supply was stopped and after standing from 5 to 7 days at 2 to 4° C. the precipitated substance was separated by filtration and washed with a little methanol. In this manner there was obtained 12.8 g. of the 3-imino compound with a melting point of 193–196° C. The infrared spectrum (KBr) of the compound showed characteristic bands at 1640 cm.$^{-1}$ and 1650 cm.$^{-1}$ (C=N) and 3220 cm.$^{-1}$ (=NH).

*Analysis.*—Calculated for C$_{20}$H$_{33}$NO: C, 79.15%; H, 10.96%; N, 4.62%. Found: C, 78.96%; H, 11.01%; N, 4.77%.

EXAMPLE 2

17α-methyl-17β-hydroxy-5α-androstane-3-spiro-3'-diaziridine

PREPARATION FROM 3-IMINO-17α-METHYL-17β-HYDROXY-5α-ANDROSTANE

A.1.—3.0 g. of the 3-imino compound mentioned in Example 1 were dissolved in 400 ml. of dry methanol. The solution was cooled in a mixture of ice and water and 5 ml. of methanolic ammonia (about 14%) were added. With stirring there were added 1.3 g. of freshly prepared hydroxylamine-O-sulfonic acid (93%) in portions. The mixture was kept cooled for a couple of hours and was then allowed to stand at room temperature for about 12 hours. The mixture was then filtered and evaporated to dryness in vacuo on a water bath. Methylene chloride and water were added to the residue, the mixture was shaken, and the methylene chloride phase was separated, washed twice with water, dried over Na$_2$SO$_4$, and evaporated to dryness in vacuo.

By the addition of 96% ethanol the residue crystallized, and there was obtained 2.1 g. of product with a melting point from 170 to 188° C.

After recrystallization from 99% ethanol there was obtained 1.7 g. of the spiro-diaziridine compound with a melting point of 193 to 195° C.

The infrared spectrum (KBr) of the compound did not show any characteristic bands in the region of 1600–1700 cm.$^{-1}$ but a distinct band at 3220 cm.$^{-1}$ (NH).

*Analysis.*—Calculated for C$_{20}$H$_{34}$N$_2$O, ½ C$_2$H$_5$OH: C, 73.85%; H, 10.92%; N, 8.20%. Found: C, 73.76%; H, 10.82%; N, 8.32%.

A.2.—To 3.0 g. of 3-imino compound were added 20 ml. of dioxane and 3.5 ml. of concentrated aqueous ammonia (25%). The suspension was placed in a mixture of ice and water and while stirring there were added in the course of about one hour 2.6 g. of hydroxylamine-O-sulfonic acid (91%) in portions. After standing for about 2 hours water and methylene chloride were added, and upon shaking the methylene chloride phase was separated, washed twice with water, dried over Na$_2$SO$_4$ and evaporated to dryness in vacuo. By addition of 99% ethanol the residue crystallized, the substance was separated by filtration and in this manner 1.3 g. of spiro-diaziridine corresponding to the compound described in A.1 was obtained.

A.3.—3.0 g. of the 3-imino compound was dissolved in 125 ml. of dry methanol. There was added 2.0 ml. of an aqueous solution of potassium hydroxide (32.4%) and thereafter with stirring 1.26 g. of freshly prepared hydroxylamine-O-sulfonic acid (96%) was added in portions. After stirring for about 16 hours there was evaporated to dryness in vacuo. Methylene chloride and water were added to the residue, and upon shaking the methylene chloride phase was separated, washed twice with water, dried over Na$_2$SO$_4$ and evaporated to dryness in vacuo. The residue crystallized with ethanol and gave 0.9 g. of the spiro-diaziridine described in A.1.

PREPARATION FROM 3-(n-BUTYL)-IMINO OR 3-CYCLOHEXYLIMINO - 17α - METHYL-17β-HYDROXY-5α-ANDROSTANE

These Schiff's bases may be prepared by dissolving the steroid in a mixture of benzene and freshly distilled amine (8 g. of steroid, 125 ml. of benzene, and 35 ml. of amine), refluxing for 5 hours, allowing to stand for about 16 hours at room temperature, if desired extracting with water, drying and evaporating to dryness.

B.1.—2.6 g. of the Schiff's base were dissolved in 100 ml. of dry methanol, cooled in a Dry Ice bath and admixed with 35 ml. of liquid ammonia. At a temperature between −30 and −40° C. 1.0 g. of hydroxylamine-O-sulfonic acid (93%) was added portionwise with stirring in the course of about half an hour. The low temperature was maintained for about 1 hour, whereafter the temperature was allowed to rise slowly to room temperature. After about 16 hours the mixture was evaporated to dryness in vacuo. Methylene chloride and water were added to the residue, the mixture was shaken vigorously, and the methylene chloride phase was separated and washed twice with water, dried, and evaporated to dryness. The residue was crystallized with alcohol, and there was obtained 0.7 g. of 17α-methyl-17β-hydroxy-5α-androstane-3-spiro-3'-diaziridine, which after recrystallization from 99% C$_2$H$_5$OH gave a melting point of 190–191° C. and an infrared spectrum which was identical with the one described in connection with method A.1.

B.2.—3.9 g. of the Schiff's base was dissolved in 125 ml. of dry methanol and treated as described in A.1, adding 6.2 ml. of methanolic ammonia (6.5 molar) and 1.3 g. of hydroxylamine-O-sulfonic acid (96%). After working up in the usual manner the residue upon crystallization with ethanol gave 1.6 g. of the spiro-diaziridine described in A.1.

C. PREPARATION FROM 3-HYDRAZONE 500 mg. of 17α-methyl-17β-hydroxy - 5α - androstane-3-dimethylhydrazone (prepared from 3-keto by dissolving in asymmetric dimethylhydrazine, adding a few drops of glacial acetic acid, allowing to stand at room temperature for 3 days, and separating the precipitated hydrazone by filtration (melting point 180 to 183° C.)) were dissolved in 15 ml. of dry methanol and treated as described in method A.1, adding 1.5 ml. of methanolic ammonia (5 molar) and 250 mg. of hydroxylamine-O-sulfonic acid. After working up and evaporation to dryness the addition of ethanol gave 200 mg. of the spiro-diaziridine compound corresponding to that obtained by method A.1.

D. PREPARATION FROM 17α-METHYL-17β-HYDROXY-5α-ANDROSTANE-3-ONE WITH HYDROXYLAMINE-O-SULFONIC ACID 3.0 g. of 17α-methyl-17β-hydroxy - 5α - androstane-3-one were dissolved in 115 ml. of dry methanol. The solution was cooled in a mixture of ice and water and 15.2 ml. of methanolic ammonia (2.6 molar) were added. With stirring there was added 1.5 g. hydroxylamine-O-sulfonic acid (96%) in portions. The mixture was kept cooled for a couple of hours and was then allowed to stand at room temperature for about 12 hours. The mixture was then filtered and evaporated to dryness in vacuo on a water bath. Methylene chloride and water were added to the residue, the mixture was shaken, and the methylene chloride phase was separated, washed twice with water, dried over $Na_2SO_4$, and evaporated to dryness in vacuo. After crystallization from 99% ethanol there was obtained 1.42 g. of the spiro-diaziridine. After recrystallization a melting point of 194 to 195° C. was obtained.

E. PREPARATION FROM 17α-METHYL-17β-HYDROXY-5α-ANDROSTANE-3-ONE WITH CHLORAMINE 3.0 g. of 17α-methyl-17β-hydroxy - 5α - androstane-3-one were dissolved in 125 ml. of dry methanol and the solution was cooled in a mixture of ice and water. Then 6.2 ml. of methanolic ammonia (6.5 molar) were added and while stirring 55.5 ml. of a solution of chloramine in ether (0.18 molar) were added dropwise thereto in the course of about 15 minutes. The solution was kept cooled for a couple of hours and was then allowed to stand at room temperature for about 15 hours. Thereafter it was evaporated to dryness in vacuo on a water bath, methylene chloride and water were added to the residue, the mixture was shaken and the methylene chloride phase was separated. The latter was washed twice with water, dried over $Na_2SO_4$ and evaporated to dryness in vacuo. The solid residue was admixed with a little 99% ethanol and separated by filtration. In this manner there was obtained 2.3 g. of spiro-diaziridine compound corresponding to that obtained by method A.1.

F. PREPARATION FROM SCHIFF'S BASE WITH CHLORAMINE 3.9 g. of 3-cyclohexyl-imino-17α-methyl-17β-hydroxy-5α-androstane were dissolved in 125 ml. of dry methanol and treated in the same manner as in method E, adding 7.2 ml. of methanolic ammonia (5.6 molar) and all in one portion 71.0 ml. of a solution of chloramine in ether (0.17 molar). After working up in the same manner 1.6 g. of the described spiro-diaziridine compound was obtained.

In biological tests, 17α-methyl-17β-hydroxy-5α-androstane-3-spiro-3'-diaziridine showed an increased peroral androgenic effect and a still further increased pereral anabolic(myotrophic) effect as compared with 17α-methyl testosterone, thus giving an increased peroral anabolic(myotrophic)/androgenic ratio as compared with 17α-methyl testosterone.

EXAMPLE 3

17α-methyl-17β-hydroxy-5α-androstane-3-spiro-3'-diazirine

PREPARATION FROM SPIRO-DIAZIRIDINE

A.1.—13.6 g. of 17α-methyly-17β-hydroxy-5α-androstane-3-spiro-3'-diaziridine were admixed with 1270 ml. of dry ether and 8.1 g. of triethylamine. The suspension was placed in ice water, and with stirring a solution of 6.4 g. $Br_2$ in 70 ml. of carbon tetrachloride was added dropwise in the course of half an hour. After stirring for one and a half hours there was washed twice with water and the solution was dried over $Na_2SO_4$ and evaporated to dryness in vacuo. The residue was crystallized by the addition of ethyl acetate. In this manner there was obtained 5.2 g. of the spiro-diazirine compound with a melting point of 155-157° C. The infrared spectrum (KBr) of the compound showed a characteristic band at 1570 cm.$^{-1}$ (N=N).

Analysis.—Calculated for $C_{20}H_{32}N_2O$: C, 75.90%; H, 10.19%; N, 8.85%. Found: C, 75.68%; H, 10.12%; N, 8.72%.

A.2.—2.9 g. of 17α-methyl - 17β - hydroxy-5α-androstane-3-spiro-3'-diaziridine were admixed with 290 ml. of dry ether. The suspension was cooled to about +10° C., and 4.6 g. of freshly prepared silver oxide were added with stirring. After stirring and cooling for 24 hours the suspension was filtered and the filtrate was evaporated to dryness. The crystalline residue, which weighed 1.7 g. after recrystallization gave the spiro-diazirine compound with a melting point of 156–157° C. and an infrared spectrum which was identical with the one described in connection with method A.1.

A.3.—To 1.7 g. of the spiro-diaziridine compound were added 35 ml. of ether. The resulting suspension was cooled in a mixture of ice and water. A solution of 1.1 g. tertiary butyl hypochlorite in 15 ml. of ether was added in three portions in the course of about 15 minutes while stirring. After stirring for about 2 hours about 70 ml. of ether were added. Thereby a clear solution was obtained, which was washed three times with water, dried over $Na_2SO_4$, and evaporated to dryness. The solid residue was filtered off by means of ethyl acetate and in this manner 1.0 g. of the spiro-diazirine compound corresponding to that described in connection with method A.1 was obtained.

B. PREPARATION FROM 3-IMINO COMPOUND 3.0 g. of 3-imino-17α-methyl-17β-hydroxy-5α-androstane were dissolved in 125 ml. of dry methanol and treated as described in Example 2, method E, adding 6.2 ml. of methanolic ammonia (6.5 molar) and 200 ml. of a solution of chloramine in ether (0.20 molar) which in this case were added in one portion. After working up in the usual manner a little 99% ethanol was added and after separation by filtration 2.0 g. of spiro-diazirine compound corresponding to that described in method A.1 were obtained.

C. PREPARATION FROM 17α-METHYL-17β-HYDROXY-5α-ANDROSTANE-3-ONE 3.0 g. of 17α-methyl-17β-hydroxy-5α-androstane-3-one were dissolved in 125 ml. of dry methanol and treated in the same manner as described in B, adding 6.4 ml. of methanolic ammonia (6.3 molar) and in one portion 200 ml. of a solution of chloramine in ether (0.20 molar). After working up in the usual manner and after addition of 99% ethanol and separation by filtration there was obtained 1.8 g. of spiro-diazirine compound corresponding to the compound described in method A.1.

In biological tests, 17α-methyl-17β-hydroxy-5α-androstane-3-spiro-3'-diazirine showed an increased peroral androgenic effect and a considerably increased peroral anabolic(myotrophic) effect as compared with 17α-methyl-testosterone, thus giving a very favourable peroral anabolic(myotrophic)/androgenic ratio as compared with 17α-methyl testosterone.

EXAMPLE 4

17α-methyl-17β-hydroxy-5α-androstane-3-spiro-3′-(1′(2′)-methyl)-diaziridine 3.0 g. of 17α-methyl-17β-hydroxy-5α-androstane-3-one were dissolved in 115 ml. of dry methanol. The solution was cooled in a mixture of ice and water and 5.0 ml. of methanolic methylamine (8.2 molar) were added. With stirring there was added 1.3 g. of hydroxylamine-O-sulfonic acid (98%) in portions. The mixture was kept cooled for a couple of hours and was then allowed to stand at room temperature for about 12 hours. The mixture was then filtered and evaporated to dryness in vacuo on a water bath. Methylene chloride and water were added to the residue, the mixture was shaken, and the methylene chloride phase was separated. The latter was washed twice with water, dried over $Na_2SO_4$ and evaporated to dryness in vacuo. By the addition of ethyl acetate to the residue the latter crystallized and there was obtained 2.5 g. of 17α-methyl-17β-hydroxy-5α-androstane-3-spiro-3′-(1′(2′)-methyl)-diaziridine with a melting point of 183 to 187° C. After recrystallization from ethyl acetate a melting point of 188 to 193° C. was obtained. The infrared spectrum (KBr) showed a characteristic band at 3125 cm.$^{-1}$ (NH).

Analysis.—Calculated for $C_{21}H_{36}N_2O$: C, 75.85%; H, 10.91%; N, 8.43%. Found: C, 75.98%; H, 10.95%; N, 8.33%.

In biological tests, 17α-methyl-17β-hydroxy-5α-androstane-3-spiro-3′-(1′(2′)-methyl)-diaziridine showed a peroral androgenic effect of the same order as that of 17α-methyl-testosterone, and a somewhat increased peroral anabolic(myotrophic)/androgenic ratio as compared with 17α-methyl-testosterone.

EXAMPLE 5

17α-methyl-17β-hydroxy-5α-androstane-3-spiro-3′-(1′(2′)-ethyl)-diaziridine 3.0 g. of 17α-methyl-17β-hydroxy-5α-androstane-3-one were dissolved in 125 ml. of dry methanol and treated in the same manner as described in Example 4, adding 5.6 ml. of methanolic ethylamine (7.1 molar) and 1.3 g. of hydroxylamine-O-sulfonic acid (98%). After working up the residue was treated with 80% acetone, which caused the residue to crystallize, and after separation by filtration there was obtained 2.6 g. of 17α-methyl-17β-hydroxy-5α-androstane - 3 - spiro-3′-(1′(2′)-ethyl)-diaziridine. After recrystallization from ethyl acetate a melting point of 102 to 107° C. was obtained. The infrared spectrum (KBr) showed a characteristic band at 3200 cm.$^{-1}$ (NH).

Analysis.—Calculated for $C_{22}H_{38}N_2O$: C, 76.25%; H, 11.05%; N, 8.08%. Found (after drying): C, 76.27%; H, 11.13%; N, 7.91%.

EXAMPLE 6

17α-methyl-17β-hydroxy-5α-androstane-3-spiro-3′-(1′(2′)-β-hydroxyethyl)-diaziridine 15.0 g. of 17α-methyl-17β-hydroxy-5α-androstane-3-one were dissolved in 625 ml. of dry methanol. The solution was cooled in a mixture of ice and water and there were added first 12.0 ml. of ethanolamine and then 6.4 g. of hydroxylamine-O-sulfonic acid (98%) in portions while stirring. After a couple of hours' cooling and subsequent standing for about 12 hours at room temperature there was evaporated to dryness in vacuo. The residue was admixed with chloroform and saturated $CaCl_2$-solution. By adding a little solid $CaCl_2$ and filtering two phases could be obtained. The chloroform phase was washed with water, dried over $Na_2SO_4$, and evaporated to dryness. By adding ethyl acetate to the residue the latter crystallized. By separation of filtration there was obtained 10.1 g. of 17α-methyl-17β-hydroxy - 5α - androstane - 3 - spiro-3′-(1′(2′)-β-hydroxyethyl)-diaziridine with a melting point of 193 to 196° C. After recrystallization from 96% ethanol a melting point of 197 to 199° C. was obtained. The infrared spectrum (KBr) showed a characteristic band at 3235 cm.$^{-1}$ (NH).

Analysis.—Calculated for $C_{22}H_{38}N_2O_2$: C, 72.88%; H, 10.56%; N, 7.73%. Found: C, 72.64%; H, 10.68%; N, 7.78%.

EXAMPLE 7

17α-methyl-17β-hydroxy-5α-androstane-3-spiro-3′-(1′(2′)-benzyl)-diaziridine 3.0 g. of 17α-methyl-17β-hydroxy-5α-androstane-3-one were dissolved in 115 ml. of dry methanol. The solution was cooled in a mixture of ice and water, and 5.3 ml. of benzylamine were added. With stirring there was added 1.3 g. of hydroxylamine-O-sulfonic acid (95%) in portions. The mixture was kept cooled for a couple of hours and was then allowed to stand at room temperature for about 12 hours. The mixture was then filtered and evaporated to dryness in vacuo on a water bath. Methylene chloride and water were added to the residue, the mixture was shaken, and the methylene chloride phase was separated, washed twice with water, dried over $Na_2SO_4$, and evaporated to dryness in vacuo.

By the addition of ethyl acetate to the residue the latter crystallized and there was obtained 1.4 g. of 17α-methyl-17β - hydroxy-5α-androstane-3-spiro-3′-(1′(2′)-benzyl)-diaziridine with a melting point of 141 to 145° C. After recrystallization from ethyl acetate/n-hexane the same melting point was obtained. The infrared spectrum (KBr) showed a characteristic band at 3190 cm.$^{-1}$ (NH).

Analysis.—Calculated for $C_{27}H_{40}N_2O$: C, 79.36%; H, 9.87%; N, 6.86%. Found: C, 79.62%; H, 10.02%; N, 6.95%.

In biological tests, 17α-methyl-17β-hydroxy-5α-androstane-3-spiro-3′-(1′(2′)-benzyl) - diaziridine showed a minor peroral androgenic effect and an increased peroral anabolic (myotrophic) effect as compared with 17α-methyl testosterone, thus giving a better peroral anabolic (myotrophic)/androgenic ratio as compared with 17α-methyl testosterone.

EXAMPLE 8

17α-methyl-17β-hydroxy-5α-androstane-3-spiro-3′-(1′,2′-dimethyl)-diaziridine 3.0 g. of 17α-methyl-17β-hydroxy-5α-androstane-3-one were dissolved in 125 ml. of dry methanol and treated in a manner corresponding to that of Example 4, but adding 11.1 ml. of methanolic methylamine (3.6 molar) and 1.5 g. of N-methyl-hydroxylamine-O-sulfonic acid (99%). After working up a little acetone was added to the residue, and filtering was effected. In this manner there was obtained 2.6 g. of 17α-methyl-17β-hydroxy-5α-androstane-3-spiro-3′-(1′,2′-dimethyl)-diaziridine. After recrystallization from ethyl acetate and subsequently from acetone a melting point of 192 to 194° C. was obtained.

Analysis.—Calculated for $S_{22}H_{38}N_2O$: C, 76.25%; H, 11.05%; N, 8.08%. Found: C, 76.20%; H, 11.17%; N, 8.18%.

EXAMPLE 9

2α,17α-dimethyl-17β-hydroxy-5α-androstane-3-spiro-3′-diaziridine

A. PREPARATION FROM 3-CYCLOHEXYL-IMINO-2α,17α-DIMETHYL-17β-HYDROXY-5α-ANDROSTANE 3.2 g. of 2α,17α-dimethyl-17β-hydroxy-5α-androstane-3-one were dissolved in 52 ml. of dry toluene and 13.0 ml. of freshly distilled cyclohexylamine. Thereafter refluxing for 20 hours was carried out while simultaneously separating the water formed. After cooling the solution was shaken three times with water and the toluene phase was dried and evaporated to dryness in vacuo.

The said residue was dissolved in 400 ml. of dry methanol, and the solution was cooled in a mixture of ice and water. 9.7 ml. of methanolic ammonia (4.2 molar) were added, and then 1.6 g. of hydroxylamine-O-sulfonic acid (98%) was added in portions while stirring. The mixture was kept cooled for a couple of hours and was then allowed to stand at room temperature for about 12 hours. The mixture was then filtered and evaporated to dryness in vacuo on a water bath. Methylene chloride and water were added to the residue, the mixture was shaken and the methylene chloride phase was separated. The latter was washed twice with water, dried over $Na_2SO_4$, and evaporated to dryness in vacuo. By the addition of ethyl acetate to the residue the latter crystallized, and there was obtained 1.0 g. of 2α,17α-dimethyl-17β-hydroxy-5α-androstane-3-spiro-3′-diaziridine with a melting point of 148 to 150° C. After recrystallization from acetone a melting point of 156 to 158° C. was obtained. The infrared spectrum (KBr) showed two characteristic bands at 3225 cm.$^{-1}$ and 3260 cm.$^{-1}$ (NH).

*Analysis.*—Calculated for $C_{21}H_{36}N_2O$: C, 75.85%; H, 10.91%; N, 8.43%. Found: C, 76.13%; H, 10.91%; N, 8.39%.

B. PREPARATION FROM 2α,17α-DIMETHYL-17β-HYDROXY-5α-ANDROSTANE-3-ONE 3.2 g. of 2α-17α-dimethyl-17β-hydroxy-5α-androstane-3-one were dissolved in 39 ml. of dry methanol and then the usual prescription was followed, adding 15.3 ml. of methanolic ammonia (2.6 molar) and 1.5 g. of hydroxylamine-O-sulfonic acid (96%). By the addition of acetone to the residue the latter crystallized, and there was obtained 1.3 g. of the spiro-diaziridine compound with a melting point of 160 to 162° C. and an infrared spectrum which was identical with the one described in connection with method A.

In biological tests, 2α,17α-dimethyl-17β-hydroxy-5α-androstane-3-spiro-3′-diaziridine showed a peroral androgenic effect of the same order as that of 17α-methyl testosterone, and an increased peroral anabolic(myotropic) effect, thus giving a very good peroral anabolic(myotropic)/androgenic ratio as compared with 17α-methyl testosterone.

EXAMPLE 10

2α,17α-dimethyl-17β-hydroxy-5α-androstane-3-spiro-3′-diazirine 1.6 g. of 2α,17α-dimethyl-17β-hydroxy-5α-androstane-3-spiro-3′-diaziridine was dissolved in 160 ml. of ether and treated in the same manner as described in Example 3, method A.1, adding 1.3 ml. of triethylamine and dropwise a solution of 0.8 g. of $Br_2$ in 7 ml. of carbon tetrachloride. After working up methanol was added to the residue, whereby the latter crystallized. After separation by filtration there was obtained 0.8 g. of 2α,17α-dimethyl-17β-hydroxy-5α-androstane-3-spiro-3′-diazirine with a melting point of 119 to 122° C. The infrared spectrum (KBr) showed a characteristic band at 1568 cm.$^{-1}$ (N=N).

*Analysis.*—Calculated for $C_{21}H_{34}N_2O$, ½ $CH_3OH$: C, 74.51%; H, 10.47%; N, 8.09%. Found: C, 74.82%; H, 10.29%; N, 7.91%.

EXAMPLE 11

4α,17α-dimethyl-17β-hydroxy-5α-androstane-3-spiro-3′-diazirine 1.0 g. of 4α,17α-dimethyl-17β-hydroxy-5α-androstane-3-one was dissolved in 50.0 ml. of dry methanol and treated in the same manner as described in Example 3, method C, adding 4.8 ml. of methanolic ammonia (3.0 molar) and 66.0 ml. of a solution of chloramine in ether (0.20 molar). The usual method of working up was followed, using chloroform, however, instead of methylene chloride. The residue was recrystallized from methanol, and in this manner 600 mg. of 4α,17α-dimethyl-17β-hydroxy-5α-androstane-3-spiro-3′-diazirine were obtained. After an additional recrystallization from methanol a melting point of 147 to 148° C. (decomp.) was obtained. The infrared spectrum (KBr) showed a characteristic band at 1570 cm.$^{-1}$ (N=N).

*Analysis.*—Calculated for $C_{21}H_{34}N_2O$, ½ mole $CH_3OH$: C, 74.52%; H, 10.47%; N, 8.08%. Found: C, 74.53%; H, 10.22%; N, 7.93%.

EXAMPLE 12

17α-methyl-17β-hydroxy-Δ$^5$-androstene-3-spiro-3′-diaziridine 27.0 g. of not recrystallized (crude) 17α-methyl-17β-hydroxy-Δ$^5$-androstene-3-one (H. J. Ringold et al., Tetrahedron Letters page 669 (1962)) were dissolved in 1120 ml. of dry methanol and treated in actually the usual manner (e.g. as in Example 2, method D), adding 116 ml. of methanolic ammonia (4.6 molar) and immediately thereafter 11.5 g. of hydroxylamine-O-sulfonic acid (96%) in one portion. After working up acetone was added to the residue, and separation by filtration was carried out. In this manner there was obtained 8.75 g. of 17α-methyl-17β-hydroxy-Δ$^5$-androstene-3-spiro-3′-diaziridine. After recrystallization from acetone a melting point of 239 to 243° C. was obtained. The infrared spectrum (KBr) showed a characteristic band at 3225 cm.$^{-1}$ (NH).

*Analysis.*—Calculated for $C_{20}H_{32}N_2O$: C, 75.90; H, 10.19%; N, 8.85%. Found: C, 76.03%; H, 10.36%; N, 8.78%.

In biological tests, 17α-methyl-17β-hydroxy-Δ$^5$-androstene-3-spiro-3′-diaziridine showed a somewhat increased peroral androgenic effect and a considerably increased peroral anabolic(myotrophic) effect as compared with 17α-methyl testosterone, thus showing a very favourable peroral anabolic(myotrophic)/androgenic ratio as compared with 17α-methyl testosterone.

EXAMPLE 13

17α-methyl-17β-hydroxy-Δ$^5$-androstene-3-spiro-3′-diazirine.

11.1 g. of 17α-methyl-17β-hydroxy-Δ$^5$-androstene-3-spiro-3′-diaziridine were admixed with 1100 ml. of ether and 9.6 ml. of triethylamine. The suspension was cooled in a mixture of ice and water and in the course of about 3 hours a solution of 6.2 g. of $Br_2$ in 60 ml. of carbon tetrachloride was added dropwise while stirring. After the addition stirring was maintained for one more hour and washing three times with water was performed. The organic phase was dried over $Na_2SO_4$ and evaporated to dryness in vacuo. The residue was dissolved in 400 ml. of acetone, and a solution of 30 g. of NaJ in 100 ml. of acetone was added. After standing for 24 hours at room temperature ether was added to the mixture, which was shaken out with sodium thiosulphate solution, sodium bicarbonate solution and at last with water. The ether solution was dried over $Na_2SO_4$ and evaporated in vacuo to a volume of 100 ml. After standing in a refrigerator the precipitated crystals were separated by filtration. In this manner there was obtained 8.1 g. of 17α-methyl-17β-hydroxy-Δ$^5$-androstene-3-spiro-3′-diazirine. After recrystallization from methanol a melting point of 140 to 142° C. was obtained. The infrared spectrum (KBr) showed a characteristic band at 1570 cm.$^{-1}$ (N=N).

*Analysis.*—Calculated for $C_{20}H_{30}N_2O$: C, 76.39%; H, 9.62%; N, 8.91%. Found (after drying): C, 76.60%; H, 9.56%; N, 8.94%.

In biological tests, 17α-methyl-17β-hydroxy-Δ$^5$-androstene-3-spiro-3′-diazirine showed a decreased peroral androgenic effect and an increased peroral anabolic (myotrophic) effect as compared with 17α-methyl testosterone, thus giving an increased peroral anabolic(myotrophic)/androgenic ratio as compared with 17α-methyl testosterone.

EXAMPLE 14

9α-fluoro-17α-methyl-11β,17β-dihydroxy-5α-androstane-3-spiro-3'-diaziridine 23.5 g. of 9α-fluoro-17α-methyl-11β,17β-dihydroxy-5α-androstane-3-one were dissolved in 1500 ml. of dry benzene. 100 ml. of cyclohexylamine were added and the solution was refluxed for 72 hours while simultaneously separating the water formed. Then there was evaporated to dryness in vacuo, ethanol was added and there was evaporated once more to dryness, whereafter the residue was recrystallized from ethanol. In this manner there was obtained 21.5 g. of the 3-cyclohexylimino compound with a melting point of 215 to 223° C. (decomp.). The infrared spectrum (KBr) showed a characteristic band at 1645 cm.$^{-1}$ (C=N).

21.5 g. of the above 3-cyclohexylimino compound were dissolved in 250 ml. of dry methanol and treated as described in Example 2, method B.2, adding 50.0 ml. of methanolic ammonia (5.0 molar) and 9.4 g. of hydroxylamine-O-sulfonic acid (98%). The working up was performed as described in the said example, except that chloroform was used instead of methylene chloride. The residue was recrystallized from acetone, and upon standing in a refrigerator and separation by filtration there was obtained 8.8 g. of 9α-fluoro-17α-methyl-11β,17β-dihydroxy - 5α - androstane-3-spiro-3'-diaziridine. After a further recrystallization from acetone a melting point of 283 to 284° C. (decomp.) was obtained. The infrared spectrum (KBr) showed a characteristic band at 3220 cm.$^{-1}$ (NH).

Analysis.—Calculated for $C_{20}H_{33}FN_2O_2$: F, 5.39%; N, 7.95%. Found: F, 5.36%; N, 7.95%.

In biological tests, 9α-fluoro-17α-methyl-11β,17β-dihydroxy-5α-androstane-3-spiro-3'-diaziridine showed a somewhat increased peroral androgenic effect and an extraordinarily increased peroral anabolic(myotrophic) effect as compared with 17α-methyl testosterone thus showing an extremely increased peroral anabolic(myotrophic)/androgenic ratio as compared with 17α-methyl testosterone, which ratio makes this compound of special interest.

EXAMPLE 15

9α-fluoro-17α-methyl-11β,17β-dihydroxy-5α-androstane-3-spiro-3'-diazirine 4.5 g. of the 3-spiro-diaziridine compound described in Example 14 were dissolved in 200 ml. of chloroform and treated in the same manner as described in Example 3, method A.1, adding 4.0 ml. of triethylamine and dropwise a solution of 2.1 g. of $Br_2$ in 50 ml. of chloroform. After working up the residue was recrystallized from ethanol, whereby 2.3 g. of 9α-fluoro-17α-methyl-11β,17β-dihydroxy-5α-androstane-3-spiro-3'-diazirine with a melting point of 178 to 182° C. (decomp.) were obtained. After an additional recrystallization from ethanol a melting point of 186 to 188° C. (decomp.) was obtained. The infrared spectrum (KBr) showed a characteristic band at 1570 cm.$^{-1}$ (N=N).

Analysis.—Calculated for $C_{20}H_{31}FN_2O_2$: F, 5.42%; N, 7.99%. Found: F, 5.36%; N, 7.99%.

EXAMPLE 16

17α-methyl-17β-hydroxy-5α-androstane-7-one-3-spiro-3'-diaziridine 10.7 g. of 17α-methyl-17β-hydroxy-5α-androstane-3,7-dione (melting point 196 to 198° C., prepared by oxidation with $CrO_3$ in pyridine from 17α-methyl-3β,17β-dihydroxy-5α-androstane-7-one, which is described by V. Schwarz, Coll. Czech. Chem. Conn. 26, 1958 (1961)) were dissolved in 600 ml. of dry methanol and treated in the same manner as described in Example 2, method D, adding 67.0 ml. of methanolic ammonia (5.0 molar) and 4.3 g. of hydroxylamine-O-sulfonic acid (96%). After working up in the usual manner the residue was recrystallized from ethyl acetate and in this way there was obtained 4.5 g. of 17α-methyl-17β-hydroxy-5α-androstane-7-one-3-spiro-3'-diaziridine with a melting point of 196 to 200° C.

The infrared spectrum (KBr) showed characteristic bands at 1704 cm.$^{-1}$ (C=O) and 3205 cm.$^{-1}$ (NH).

Analysis. — Calculated for $C_{20}H_{32}N_2O_2$: N, 8.43%. Found: N, 8.38%.

EXAMPLE 17

17α-methyl-17β-hydroxy-5α-estrane-3-spiro-3'-diaziridine

A. PREPARATION FROM 3-CYCLOHEXYL-IMINO-17α-METHYL-17β-HYDROXY-5α-ESTRANE

The said Schiff's base may be prepared by dissolving one part of the 3-keto compound in 12 parts of dry ethanol, adding two parts of cyclohexylamine, refluxing for 16 hours and thereafter evaporating to dryness. After recrystallization from ethyl acetate the 3-cyclohexylimine compound with a melting point of 150 to 151° C. was obtained.

5.0 g. of 3-cyclohexylimino-17α-methyl-17β-hydroxy-5α-estrane were dissolved in 50.0 ml. of dry methanol. After cooling and addition of 10.0 ml. of methanolic ammonia (5.0 molar) and 1.7 g. of hydroxylamine-O-sulfonic acid (98%) the usual prescription was followed. The residue which formed after evaporation was recrystallized directly from acetone, and in this manner there was obtained 1.7 g. of 17α-methyl-17-hydroxy-5α-estrane-3-spiro-3'-diaziridine with a melting point of 158 to 161° C. From the mother liquor a further 0.3 g. were recovered. The infrared spectrum (KBr) showed characteristic bands at 3110 cm.$^{-1}$ and 3215 cm.$^{-1}$ (NH).

Analysis.—Calculated for $C_{19}H_{32}N_2O$: C, 74.95%; H, 10.59%; N, 9.21%. Found (after drying at 50° C. in vacuo): C, 74.93%; H, 10.76%; N, 9.13%.

B. PREPARATION FROM 17α-METHYL-17β-HYDROXY-5α-ESTRANE-3-ONE 6.6 g. of the 3-keto compound were dissolved in 100 ml. of dry methanol. After cooling and addition of 20.0 ml. of methanolic ammonia (5 molar) and 3.4 g. of hydroxyamine-O-sulfonic acid (98%) the usual prescription was followed. After recrystallization from acetone there was obtained 3.6 g. of 17α-methyl-17β-hydroxy-5α-estrane-3-spiro-3'-diaziridine with a melting point of 158 to 160° C. The infrared spectrum was identical with the one described in connection with method A.

In biological tests, 17α-methyl-17β-hydroxy-5α-estrane-3-spiro-3'-diaziridine showed a somewhat lower peroral androgenic effect than 17α-methyl-testosterone, and besides a very pronounced peroral anti-estrogenic effect. In the biological tests for determination of the anti-estrogenic effect, Fluoxymesterone was used as reference substance.

EXAMPLE 18

17α-methyl-17β-hydroxy-5α-estrane-3-spiro-3'-diazirine 3.8 g. of the 3-spiro-diaziridine described in Example 17 were dissolved in 50 ml. of chloroform and treated as described in Example 3, method A.1, adding 3.5 ml. of triethylamine and dropwise a solution a 2.0 g. of $Br_2$ in 10 ml. of chloroform. After working up the residue was recrystallized from acetone, which resulted in 2.8 g. of 17α - methyl-17β-hydroxy-5α-estrane-3-spiro-3'-diazirine with a melting point of 148 to 150° C. (decomp.). After a further recrystallization from acetone a melting point of 152 to 153° C. (decomp.) was obtained. The infrared spectrum (KBr) showed a characteristic band at 1580 cm.$^{-1}$ (N=N).

Analysis.—Calculated for $C_{19}H_{30}N_2O$: C, 75.45%; H, 10.00%; N, 9.26%. Found: C, 75.18%; H, 10.15%; N, 9.05%.

In biological tests, 17α-methyl-17β-hydroxy-5α-estrane-3-spiro-3'-diazirine showed a peroral androgenic effect of the same order as that of 17α-methyl testosterone and a somewhat increased peroral anabolic (myotrophic)/androgenic ratio as compared with 17α-methyl-testosterone.

EXAMPLE 19

5α-androstane-17-one-3-spiro-3'-diaziridine 10.0 g. of 5α-androstane-3,17-dione were dissolved in 500 ml. of dry methanol and treated in the same manner as in Example 2, method D, adding 70.0 ml. of methanolic ammonia (5.0 molar) and 4.5 g. of hydroxyamine-O-sulfonic acid (96%). After working up the residue was recrystallized from ethyl acetate, and in this manner 5.4 g. of 5α-androstane-17-one-3-spiro-3'-diaziridine with a melting point of 185 to 190° C. were obtained. The infrared spectrum (KBr) showed characteristic bands at 1725 cm.$^{-1}$ (C=O) and 3220 cm.$^{-1}$ (NH).

Analysis.—Calculated for $C_{19}H_{30}N_2O$: C, 75.44%; H, 10.00%; N, 0.27%. Found: C, 75.31%; H, 9.97%; N, 9.27%.

In biological tests, 5α-androstane-17-one-3-spiro-3'-diaziridine showed a peroral anabolic(myotrophic) effect of the same order as that of 17α-methyl testosterone and an increased peroral anabolic(myotrophic)/androgenic ratio as compared with 17α-methyl testosterone.

EXAMPLE 20

5α-androstane-17-one-3-spiro-3'-diazirine 8.5 g. of the 3-spiro-diaziridine described in Example 19 were admixed with 850 ml. of ether and treated as described in Example 3, method A.1, adding 7.7 ml. of triethylamine and dropwise a solution of 4.5 g. of Br$_2$ in 120 ml. of carbon tetrachloride in the course of one and a half hours. After the reaction had taken place ethyl acetate was added and then the usual working up was carried out. The residue formed was recrystallized from methanol, and in this way there was obtained 6.2 g. of 5α-androstane-17-one-3-spiro-3'-diazirine with a melting point of 128 to 132° C. The infrared spectrum (KBr) showed characteristic bands at 1576 cm.$^{-1}$ (N=N) and 1735 cm.$^{-1}$ (C=O).

Analysis.—Calculated for $C_{19}H_{28}N_2O$: C, 75.96%; H, 9.39%; N, 9.32%. Found: C, 75.91%; H, 9.38%; N, 9.26%.

In biological tests, 5α-androstane-17-one-3-spiro-3'-diazirine showed a peroral anabolic(myotrophic)effect of the same order as that of 17α-methyl testosterone and an increased peroral anabolic(myotrophic)/androgenic ratio as compared with 17α-methyl testosterone. Subcutanously, 5α - androstane - 17 - one - 3 - spiro-3'-diazirine showed no androgenic effect, but an anti-estrogenic effect of the same order as that of testosterone propionate.

EXAMPLE 21

17β-hydroxy-5α-androstane-3-spiro-3'-diaziridine

A. WITH HYDROXYLAMINE-O-SULFONIC ACID

The preparation can be made for example from Schiff's bases e.g. 3-cyclohexyl-imino-17β-hydroxy-5α-androstane in the usual manner or directly from the 3-keto-compound, the latter being illustrated by the below example.

2.9 g. of 17β-hydroxy-5α-androstane-3-one were dissolved in 100 ml. of dry methanol and cooled in a mixture of ice and water. There were added 5.2 ml. of methanolic ammonia (7.6 molar) and thereafter portionwise while stirring 1.3 g. of hydroxylamine-O-sulfonic acid (98%). In the course of about one hour the mixture changed into a jelly. After standing for 18 hours at room temperature 600 ml. of methylene chloride were added. The mixture was shaken three times with water, and the methylene chloride phase was dried and evaporated to dryness in vacuo. The solid residue was filtered off by means of 99% ethanol, and in this manner there was obtained 1.4 g. of 17β-hydroxy-5α-androstane-3-spiro-3'-diaziridine with a melting point of 183 to 185° C. After recrystallization from ethyl acetate a melting point of 190 to 192° C. was obtained. The infrared spectrum showed a characteristic band at 3210 cm.$^{-1}$ and a minor one at 3250 cm.$^{-1}$ (NH).

Analysis.—Calculated for $C_{19}H_{32}N_2O$: C, 74.95%; H, 10.60%; N, 9.20%. Found: C, 75.13%; H, 10.67%; N, 9.12%.

B. WITH CHLORAMINE

Also in this case the preparation can be made for example from Schiff's bases, such as 3-cyclohexyl-imino compounds in the usual manner (Example 2, method F) or directly from 3-keto compounds, the latter being illustrated by the below example.

2.9 g. of 17β-hydroxy-5α-androstane-3-one were dissolved in 125 ml. of dry methanol and treated as described in Example 2, method E, adding 8.3 ml. of methanolic ammonia (4.8 molar) and dropwise 50.0 ml. of a solution of chloramine in ether (0.2 molar). After working up in the usual manner 2.1 g. of the 3-spiro-3'-diaziridine compound described above were obtained.

In biological tests, 17β-hydroxy-5α-androstane-3-spiro-3'-diaziridine showed an improved peroral anabolic (myotrophic)/androgenic ratio as compared with 17α-methyl testosterone.

EXAMPLE 22

17β-hydroxy-5α-androstane-3-spiro-3'-diaziridine

A. PREPARATION FROM SPIRO-DIAZIRIDINE

To 3.1 g. of 17β-hydroxy-5α-androstane-3-spiro-3'-diaziridine were added 310 ml. of ether and 2.1 g. of triethylamine. This suspension was placed in ice-water and while stirring a solution of 1.6 g. of Br$_2$ in 16 ml. of carbon tetrachloride was added dropwise. After further stirring for half an hour washing three times with water was performed, and the solution was dried over Na$_2$SO$_4$ and evaporated to dryness in vacuo. By addition of ethyl acetate to the residue the latter crystallized, and there was obtained 1.5 g. of 17β-hydroxy-5α-androstane-3-spiro-3'-diazirine with a melting point of 144 to 146° C. After recrystallization from ethyl acetate a melting point of 147 to 149° C. was obtained. The infrared spectrum (KBr) showed a characteristic band at 1572 cm.$^{-1}$ (N=N).

Analysis.—Calculated for $C_{19}H_{30}N_2O$: C, 75.45%; H, 10.00%; N, 9.26%. Found: C, 75.48%; H, 10.10%; N, 9.25%.

B. PREPARATION FROM SCHIFF'S BASE 3.7 g. of 3-cyclohexyl-imino-17β-hydroxy-5α-androstane were dissolved in 125 ml. of dry methanol and treated in the manner described in Example 3, method B, adding 6.4 ml. of methanolic ammonia (6.3 molar) and 222.0 ml. of a solution of chloramine in ether (0.18 molar). By following the usual prescription there was obtained 0.9 g. of the 3-spiro-diazirine compound described above.

C. PREPARATION FROM 17β-HYDROXY-5α-ANDROSTANE-3-ONE 2.9 g. of 17β-hydroxy-5α-androstane-3-one were dissolved in 125 ml. of dry methanol and treated in the manner described in Example 3, method C, adding 6.2 ml. of methanolic ammonia (6.5 molar) and 200 ml. of a solution of chloramine in ether (0.2 molar). After working up in the usual manner there was obtained 1.3 g. of the 3-spiro-diazirine compound described above.

In biological tests, 17β-hydroxy-5α-androstane-3-spiro-3'-diazirine showed an improved peroral anabolic(myotrophic)/androgenic ratio as compared with 17α-methyl testosterone.

EXAMPLE 23

17β-formyloxy-5α-androstane-3-spiro-3'-diazirine 4.1 g. of 17β - hydroxy - 5α - androstane-3-spiro-3'-diazirine were dissolved in 30 ml. of dry pyridine. The resulting solution was placed in a mixture of ice and water and was admixed with a mixture prepared about 20 hours previously and consisting of 5.6 ml. of formic acid and 15.0 ml. of acetic anhydride. After standing for 5 hours at room temperature the mixture was evaporated to dryness in vacuo. The residue was dissolved in ether, and washing three times with water, drying over $Na_2SO_4$ and evaporating to dryness was performed. The solid residue was admixed with a little ethanol and was separated by filtration. In this manner there were obtained 3.1 g. of 17β-formyloxy-5α-androstane-3-spiro-3′-diazirine with a melting point of 97 to 104° C. After recrystallization from 99% ethanol a melting point of 104 to 107° C. was obtained. The infrared spectrum (KBr) showed characteristic bands at 1577 cm.$^{-1}$ (N=N) and 1720 cm.$^{-1}$ (—CO—O—).

*Analysis.*—Calculated for $C_{20}H_{30}N_2O_2$: C, 72.69%; H, 9.15%; N, 8.48%. Found: C, 72.78%; H, 9.08%; N, 8.25%.

In biological tests, 17β-formyloxy-5α-androstane-3-spiro-3′-diazirine showed a very much lowered peroral androgenic effect but an increased peroral anabolic(myotrophic) effect as compared with 17α-methyl testosterone, thus showing a favourable/peroral anabolic(myotrophic)/androgenic ratio as compared with 17α-methyl testosterone.

EXAMPLE 24

17β-acetoxy-5α-androstane-3-spiro-3′-diazirine

To 1.5 g. of 17β-hydroxy-5α-androstane-3-spiro-3′-diazirine was added a mixture previously cooled to about +2° C. and consisting of 4.5 ml. of pyridine and 4.5 ml. of acetic anhydride. After stirring for about one hour at room temperature a clear solution was obtained and after further standing for 3 hours some evaporation in vacuo was carried out, whereafter ether was added. The resulting solution was washed five times with water, dried over $Na_2SO_4$ and evaporated to dryness in vacuo. The solid residue was admixed with a little ethanol and separated by filtration. In this manner there was obtained 1.1 g. of 17β-acetoxy-5α-androstane-3-spiro-3′-diazirine with a melting point of 138 to 140° C. After recrystallization from 99% ethanol a melting point of 139 to 140° C. was obtained. The infrared spectrum (KBr) showed characteristic bands at 1572 cm.$^{-1}$ (N=N) and 1725 cm.$^{-1}$ (—CO—O—).

*Analysis.*—Calculated for $C_{21}H_{32}N_2O_2$: C, 73.21%; H, 9.37%; N, 8.13%. Found: C, 73.48%; H, 9.31%; N, 8.00%.

In biological tests, 17β-acetoxy-5α-androstane-3-spiro-3′-diazirine showed a lowered peroral androgenic effect as compared with 17α-methyl testosterone and a peroral anabolic (myotrophic) effect of the same order as that of 17α-methyl testosterone, thus giving an increased peroral anabolic (myotrophic)/androgenic ratio as compared with 17α-methyl testosterone.

EXAMPLE 25

17β-acetoxy-Δ$^5$-androstene-3-spiro-3′-diazirine 54.0 g. of crude (not recrystallized) 17β-hydroxy-Δ$^5$-androstene-3-one (H. J. Ringold et al., Tetrahedron Letters page 669 (1962) were dissolved in 2200 ml. of dry methanol and treated as described in Example 12, adding 242 ml. of methanolic ammonia (5.3 molar) and 26.6 g. of hydroxylamine-O-sulfonic acid (96%). After working up in the usual manner there was obtained a residue containing the 3-spiro-3′-diaziridine and some Δ$^4$-3-keto compound. 50.0 g. of this residue was dissolved in a mixture of 2000 ml. of ether, 500 ml. of chloroform and 50 ml. of triethylamine, and the resulting solution was cooled in a mixture of ice and water. Thereafter in the course of one hour a solution of 7.9 g. of $Br_2$ in 100.0 ml. of chloroform was added dropwise with stirring. After the addition, stirring was continued for half an hour more whereafter there was shaken with diluted acetic acid, water, $NaHCO_3$ solution and at last with water. After drying over $Na_2SO_4$ there was evaporated to dryness in vacuo.

The resulting residue was dissolved in 500.0 ml. of acetone and a solution of 50.0 g. of sodium iodide in 150 ml. of acetone was added. After standing for 24 hours at room temperature ether was added and there was shaken with sodium thiosulphate solution, water, $NaHCO_3$ solution and at last with water. After drying over $Na_2SO_4$ there was evaporated to dryness in vacuo. The residue was recrystallized from methanol and gave 12.6 g. of 17β-hydroxy-Δ$^5$-androstene-3-spiro-3′-diazirine. The infrared spectrum (KBr) showed a characteristic band at 1571 cm.$^{-1}$ (N=N).

11.1 g. of 17β-hydroxy-Δ$^5$-androstene-3-spiro-3′-diazirine were dissolved in a pre-cooled mixture of 88.0 ml. of pyridine and 44.0 ml. of acetic anhydride. After standing for 20 hours at room temperature and thereafter for 20 hours at about +2° C. the precipitated crystals were separated by filtration and washed with methanol. After recrystallization from methanol 6.3 g. of 17β-acetoxy-Δ$^5$-androstene-3-spiro-3′-diazirine with a melting point of 153 to 154° C. were obtained. From the mother liquid additional 2.0 g. were recovered. The infrared spectrum (KBr) showed characteristic bands at 1569 cm.$^{-1}$ (N=N) and 1724 cm.$^{-1}$ (—CO—O—).

*Analysis.*—Calculated for $C_{21}H_{30}N_2O_2$: C, 73.65%; H, 8.83%; N, 8.18%. Found: C, 73.84%; H, 8.74%; N, 8.38%.

EXAMPLE 26

17β-propionyloxy-5α-androstane-3-spiro-3′-diaziridine 3.4 g. of 17β-propionyloxy-5α-androstane-3-one were dissolved in 150 ml. of dry methanol and treated in the same manner as described in Example 2, method E, adding 7.2 ml. of methanolic ammonia (5.6 molar) and dropwise 77.0 ml. of a solution of chloramine in ether (0.13 molar). After working up in the usual manner the residue was admixed with ethanol and after separation by filtration there was obtained 1.2 g. of 17β-propionyloxy-5α-androstane-3-spiro-3′-diaziridine. After recrystallization from acetone a melting point of 164 to 167° C. was obtained. The infrared spectrum (KBr) showed characteristic bands at 1720 cm.$^{-1}$ (—CO—O—) and 3200 cm.$^{-1}$ (NH).

*Analysis.*—Calculated for $C_{22}H_{36}N_2O_2$: C, 73.29%; H, 10.06%; N, 7.77%. Found: C, 73.10%; H, 9.93%; N, 7.73%.

EXAMPLE 27

17β-propionyloxy-5α-androstane-3-spiro-3′-diazirine 1.5 g. of 17β-hydroxy-5α-androstane-3-spiro-3′-diazirine were treated in a manner corresponding to that described in Example 24 except that this time a mixture of 5 ml. of pyridine and 5 ml. of propionic anhydride was added. After working up ethanol was added to the residue, the substance separated by filtration and in this manner there was obtained 1.3 g. of 17β-propionyloxy-5α-androstane-3-spiro-3′-diazirine. After recrystallization from 99% ethanol a melting point of 121 to 124° C. was obtained. The infrared spectrum (KBr) showed characteristic bands at 1572 cm.$^{-1}$ (N=N) and 1725 cm.$^{-1}$ (—CO—O—).

*Analysis.*—Calculated for $C_{22}H_{34}N_2O_2$: C, 73.70%; H, 9.56%; N, 7.81%. Found: C, 73.64%; H, 9.57%, N, 8.01%.

In biological tests, 17β-propionyloxy-5α-androstane-3-sprio-3′-diazirine showed a lowered peroral androgenic effect and an increased peroral anabolic(myotrophic) effect as compared with 17α-methyl testosterone, thus giving a valuably increased peroral anabolic(myotrophic)/androgenic ratio as compared with 17α-methyl testosterone.

EXAMPLE 28

17β-(3-phenylpropionyloxy)-5α-androstane-3-spiro-3'-diazirine 3.0 g. of 17β-hydroxy-5α-androstane-3-spiro-3'-diazirine were dissolved in 20 ml. of dry benzene and 12.0 ml. of dry pyridine. The solution was placed in a mixture of ice and water and while stirring a solution of 2.5 g. of 3-phenylpropionyl chloride in 10.0 ml. of dry benzene was added dropwise. After stirring with cooling for about 15 minutes the mixture was allowed to stand at about +2° C. for 18 hours. Thereafter ether was added thereto and the mixture was shaken twice with 100 ml. of ice cold 0.5 normal $H_2SO_4$ and thereafter, also twice, with 100 ml. of 0.5 normal NaOH solution and at last twice with water. After drying over $Na_2SO_4$ evaporation in vacuo was performed. The residue, which was a yellow oil, was admixed with ethanol whereafter the crystals formed were separated by filtration. In this way 3.6 g. of 17β - (3 - phenylpropionyloxy) - 5α - androstane - 3-spiro-3'-diazirine with a melting point of 119 to 121° C. were obtained. After recrystallization from 99% ethanol 2.9 g. with a melting point of 121 to 124° C. were obtained. The infrared spectrum (KBr) showed characteristic bands at 1568 cm.$^{-1}$ (N=N) and 1730 cm.$^{-1}$ (—CO—O—).

Analysis.—Calculated for $C_{28}H_{38}N_2O_2$: C, 77.38%; H, 8.81%; N, 6.45%. Found: C, 77.18%; H, 8.66%; N, 6.49%.

EXAMPLE 29

17β-heptanoyloxy-5α-androstane-3-spiro-3'-diazirine 3.0 g. of 17β-hydroxy-5α-androstane-3-spiro-3'-diazirine were treated in the same manner as in Example 28, this time adding 2.2 g. of heptanoylchloride dissolved in 10.0 ml. of dry benzene. By adding ethanol and a little water to the residue crystals were obtained. Upon separation by filtration 2.9 g. of 17β-heptanoyloxy-5α-androstane-3-spiro-3'-diazirine with a melting point of 45 to 55° C. were obtained. After recrystallization from 96% ethanol a melting point of 52 to 56° C. was obtained. The infrared spectrum (KBr) showed characteristic bands at 1573 cm.$^{-1}$ (N=N) and 1725 cm.$^{-1}$ (—CO—O—).

Analysis.—Calculated for $C_{26}H_{42}N_2O_2$: C, 75.32%; H, 10.21%; N, 6.76%. Found: C, 75.38%; H, 9.96%; N, 6.84%.

EXAMPLE 30

Ethyl ester of 17β-sulfoacetoxy-5α-androstane-3-spiro-3'-diazirine 1.0 g. of 17β-hydroxy-5α-androstane-3-spiro-3'-diazirine and 353 mg. of pulverized anhydrous $Na_2CO_3$ were added to 6.3 ml. of dry benzene. A solution of 590 mg. of chlorosulfonyl-acetylchloride in 6.3 ml. of dry benzene were added to this suspension while stirring. After stirring for half an hour the suspension was filtered and the filtrate was evaporated to dryness in vacuo. By adding 99% ethanol the residue crystallized, and by separating by filtration there was obtained 0.8 g. of ethyl ester of 17β-sulfoacetoxy-5α-androstane-3-spiro-3'-diazirine with a melting point of 132 to 136° C. After recrystallization from 99% ethanol a melting point of 138 to 140° C. was obtained. The infrared spectrum (KBr) showed characteristic bands at 1573 cm.$^{-1}$ (N=N) and 1742 cm.$^{-1}$ (—CO—O—).

Analysis.—Calculated for $C_{23}H_{36}N_2O_5S$: C, 61.03%; H, 8.02%; N, 6.19%; S, 7.09%. Found: C, 61.19%; H, 8.07%; N, 6.22%; S, 7.08%.

Having thus fully described my invention I claim as new and desire to secure by Letters Patent:

1. 17α - lower - alkyl - 11β,17β - dihydroxy - 9α - fluoro-5α-androstane-3-spiro-3'-diazirine or -diaziridine.

2. 17β - acyloxy - 11β - hydroxy - 9α - fluoro - 5α - androstane-3-spiro-3'-diazirine or -diaziridine.

3. 17α - methyl - 11β,17β - dihydroxy - 9α - fluoro - 5α-androstane-3-spiro-3'-diazirine or -diaziridine.

4. 2α - methyl - 9α - fluoro - 17α - alkyl - 11β,17β - dihydroxy-5α-androstane-3-spiro-3'-diazirine or -diaziridine.

5. 2α,17α - dimethyl - 17β - hydroxy - 5α - androstane-3-spiro-3'-diazirine or -diaziridine.

6. 17α - methyl - 17β - hydroxy - 5α - androstane - 3-spiro-3'-diazirine or -diaziridine.

7. 17α - methyl - 17β - hydroxy - Δ⁵-androstene - 3-spiro-3'-diazirine or -diaziridine.

8. 17β - acyloxy - 5α - androstane - 3 - spiro - 3' - diazirine or -diaziridine.

9. 17β - formyloxy - 5α - androstane - 3 - spiro - 3'-diazirine or -diaziridine.

10. 17β - proprionyloxy - 5α - androstane - 3 - spiro - 3'-diazirine or -diaziridine.

11. 5α-androstane-17-one-3-spiro-3'-diazirine or diaziridine.

12. 17β - acyloxy - Δ⁵ - androstene - 3 - spiro - 3' - diazirine or -diaziridine.

13. 17β - acyloxy - 11β - hydroxy - 9α - fluoro - Δ⁵-androstene-3-spiro-3'-diazirine or -diaziridine.

14. 17α - lower - alkyl - 17β - hydroxy - 5α - estrane-3-spiro-3'-diazirine or -diaziridine.

15. Steroid compounds having the formula

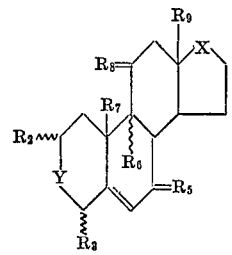

in which the dotted line between positions 5 and 6 denotes the optional presence of a double bond, Y designates a structure selected from the group consisting of

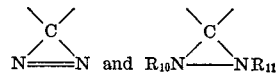

wherein $R_{10}$ and $R_{11}$ are each selected from the group consisting of hydrogen, lower-alkyl, lower-hydroxyalkyl, and phenyl-lower-alkyl, X designates a structure selected from the group consisting of

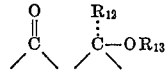

wherein $R_{12}$ is selected from the group consisting of hydrogen and lower alkyl, and $R_{13}$ is selected from the group consisting of hydrogen and $OCR_{14}$, wherein $R_{14}$ is selected from the group consisting of hydrogen, alkyl, phenyl-lower-alkyl, phenyl, alkoxyphenyl, cycloalkyl and alkoxy-sulfonylalky, $R_2$ and $R_3$ are each selected from the group consisting of hydrogen and methyl, $R_5$ is selected from the group consisting of oxygen, two hydrogen atoms, and hydrogen and methyl, $R_6$ is selected from the group consisting of hydrogen, chlorine and fluorine, $R_7$ is selected from the group consisting of hydrogen and methyl, $R_8$ is selected from the group consisting of two hydrogen atoms, hydrogen and hydroxyl, and oxygen, and $R_9$ is lower alkyl.

16. Steroid compounds as defined in claim 15 and having the formula

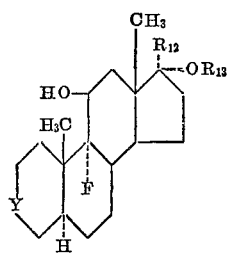

in which Y, $R_{12}$ and $R_{13}$ have the meaning defined in claim 15.

17. Steroid compounds as defined in claim 15 and having the formula

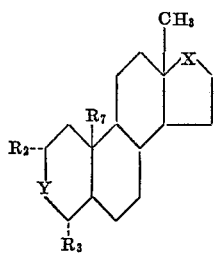

wherein $R_2$, $R_3$ and $R_7$ have the meaning defined in claim 15,

Y is selected from the group consisting of

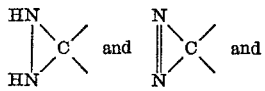

X is selected from the group consisting of

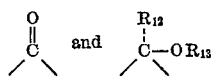

wherein $R_{12}$ and $R_{13}$ have the meaning defined in claim 15.

18. Steroid compounds as defined in claim 17 and having the formula

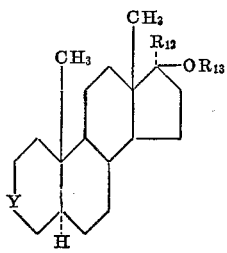

in which Y has the meaning defined in claim 17, $R_{12}$ is selected from the group consisting of hydrogen and methyl and $R_{13}$ is selected from the group consisting of hydrogen and alkanoyl.

19. Steroid compounds having the formula

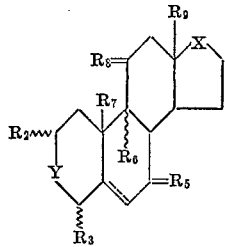

in which the dotted line between positions 5 and 6 denotes the optional presence of a double bond, Y is the group RN=C<, wherein R is selected from the group consisting of hydrogen, alkyl, cycloalkyl and hydrazyl, X designates a structure selected from the group consisting of

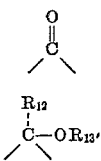

wherein $R_{12}$ is selected from the group consisting of hydrogen and lower alkyl, and $R_{13}$ is selected from the group consisting of hydrogen and $OCR_{14}$, wherein $R_{14}$ is selected from the group consisting of hydrogen, alkyl, phenyl-lower-alkyl, phenyl, alkoxyphenyl, cycloalkyl and alkoxy-sulfonylalkyl, $R_2$ and $R_3$ are each selected from the group consisting of hydrogen and methyl, $R_5$ is selected from the group consisting of oxygen, two hydrogen atoms, and hydrogen and methyl, $R_6$ is selected from the group consisting of hydrogen, chlorine and fluorine, $R_7$ is selected from the group consisting of hydrogen and methyl, $R_8$ is selected from the group consisting of two hydrogen atoms, hydrogen and hydroxyl, and oxygen, and $R_9$ is lower alkyl.

20. A method of preparing the steroid compounds defined in claim 15, in which Y is

which comprises reacting a steroid compound having the formula

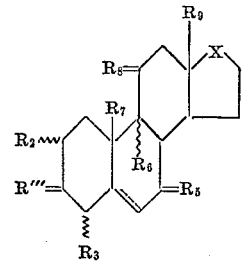

in which the dotted line between positions 5 and 6 denotes the optional presence of a double bond, and $R_2$, $R_3$, $R_5$, $R_6$, $R_7$, $R_8$, $R_9$ and X are as defined in claim 15 and R″ is selected from the group consisting of oxygen, imino and hydrazyl, with a molar excess of chloramine in the presence of $NH_3$.

21. A method of preparing the steroid compounds defined in claim 15, in which Y is

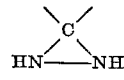

which comprises reacting a steroid compound having the formula

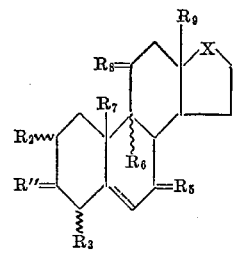

in which the dotted line between positions 5 and 6 denotes the optional presence of a double bond, and $R_2$, $R_3$, $R_5$, $R_6$, $R_7$, $R_8$, $R_9$ and X are as defined in claim 15 and R″ is selected from the group consisting of oxygen, imino and hydrazyl, with ammonia in the presence of a member of the group consisting of hydroxylamine-O-sulfonic acid and chloramine, said chloramine being used in equimolar amounts.

22. A method of preparing the steroid compounds defined in claim 15, in which Y is

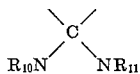

wherein $R_{10}$ and $R_{11}$ are each selected from the group consisting of lower-alkyl, lower-hydroxyalkyl and phenyl-lower-alkyl, which comprises reacting a steroid compound having the formula

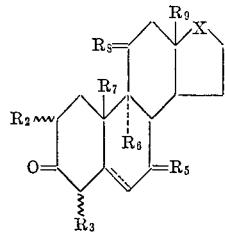

in which the dotted line between positions 5 and 6 denotes the optional presence of a double bond, and $R_2$, $R_3$, $R_5$, $R_6$, $R_7$, $R_8$, $R_9$ and X have the meaning defined in claim 15 with a member of the group consisting of R′NHOSO$_2$OH and R′NHCl in the presence of R″NH$_2$, in which R′ and R″ are each selected from the group consisting of lower-alkyl, lower-hydroxyalkyl and phenyl-lower-alkyl.

23. A method of preparing the steroid compounds defined in claim 15, in which Y is

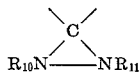

wherein $R_{10}$ and $R_{11}$ are each selected from the group consisting of lower-alkyl, lower-hydroxyalkyl and phenyl-lower-alkyl, which comprises reacting a steroid compound having the formula

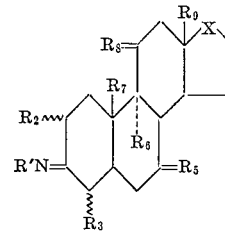

in which $R_2$, $R_3$, $R_5$, $R_6$, $R_7$, $R_8$, $R_9$ and X have the meaning defined in claim 15, and R′ means one of the groups $R_{10}$ and $R_{11}$, with a member of the group consisting of R″NHOSO$_2$OH and R″NHCl in which R″ is selected from the group consisting of lower-alkyl, lower-hydroxyalkyl and phenyl-lower-alkyl in the presence of a member of the group consisting of an amine and alkali metal hydroxide.

24. A method of preparing the steroid compounds defined in claim 15, in which Y is

wherein $R_{10}$ is selected from the group consisting of lower-alkyl, lower-hydroxyalkyl and phenyl-lower-alkyl which comprises reacting a steroid compound having the formula

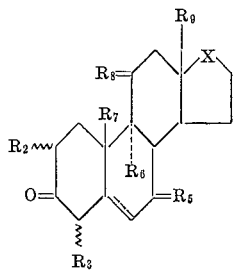

in which the dotted line between positions 5 and 6 denotes the optional presence of a double bond, and $R_2$, $R_3$, $R_5$, $R_6$, $R_7$, $R_8$, $R_9$ and X have the meaning defined in claim 15 with an amine of the formula $R_{10}NH_2$ wherein $R_{10}$ is as already defined in the presence of a member of the group consisting of hydroxylamine-O-sulfonic acid and chloramine.

25. A method of preparing the steroid compounds defined in claim 15, in which Y is

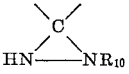

wherein $R_{10}$ is selected from the group consisting of lower-alkyl, lower-hydroxyalkyl and phenyl-lower-alkyl which comprises reacting a steroid having the formula

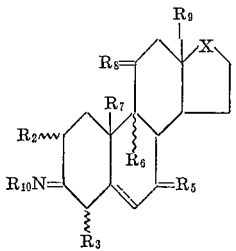

in which the dotted line between positions 5 and 6 denotes the optional presence of a double bond, and $R_2$, $R_3$, $R_5$, $R_6$, $R_7$, $R_8$, $R_9$ and X have the meaning defined in claim 15 and $R_{10}$ is as already defined with a member of the group hydroxylamine-O-sulfonic acid and chloramine, the chloramine being used in equimolar amounts, in the presence of a member of the group consisting of an amine and an alkali metal hydroxide.

No references cited.

ELBERT L. ROBERTS, Primary Examiner

U.S. Cl. X.R.

260—397, 999